US008395705B2

(12) United States Patent
Lee (10) Patent No.: US 8,395,705 B2
(45) Date of Patent: Mar. 12, 2013

(54) AUTO INSTALL APPARATUS AND METHOD FOR AV DEVICE CONNECTION WITH DIGITAL TV

(75) Inventor: Jin Lee, Gumi-Si (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 12/514,378

(22) PCT Filed: Nov. 9, 2007

(86) PCT No.: PCT/KR2007/005639
§ 371 (c)(1),
(2), (4) Date: Sep. 4, 2009

(87) PCT Pub. No.: WO2008/056954
PCT Pub. Date: May 15, 2008

(65) Prior Publication Data
US 2010/0053434 A1  Mar. 4, 2010

(30) Foreign Application Priority Data
Nov. 9, 2009  (KR) .................. 10-2006-0110427

(51) Int. Cl.
*H04N 7/00* (2011.01)

(52) U.S. Cl. ...................................... 348/552

(58) Field of Classification Search .......... 348/552, 348/553, 725, 726, 554, 705, 706; 386/94, 386/46, 135; 725/133, 153
See application file for complete search history.

(56) References Cited

U.S. PATENT DOCUMENTS

| 5,589,878 | A   | * | 12/1996 | Cortjens et al. ......... 348/211.12 |
| 7,809,139 | B2  | * | 10/2010 | Choi et al. .................... 380/210 |
| 7,810,129 | B2  | * | 10/2010 | Yamada et al. ............... 725/133 |
| 7,844,355 | B2  | * | 11/2010 | Yahata et al. ................... 700/94 |
| 2003/0235397 | A1 | * | 12/2003 | Chu ................. 386/46 |
| 2004/0028375 | A1 | * | 2/2004  | Kim et al. ....................... 386/46 |
| 2004/0117858 | A1 | * | 6/2004  | Boudreau et al. ............. 725/144 |

(Continued)

FOREIGN PATENT DOCUMENTS

| CN | 1836441 A   | 9/2006 |
| EP | 1 624 669 A2 | 2/2006 |

(Continued)

OTHER PUBLICATIONS

Anonymous: "High-Definition Multimedia Specification," Specification Version 1.3, Jun. 22, 2006.

*Primary Examiner* — Paulos M Natnael
(74) *Attorney, Agent, or Firm* — Birch, Stewart, Kolasch & Birch, LLP (57) ABSTRACT

Disclosed herein are an apparatus and a method for automatically setting an external device (100) connected to a digital television (200). The specific region function and user language function are automatically set and controlled in the external device (100) based on data set in the TV using the HDMI CEC protocol. In addition, when a digital versatile disc (DVD) is played, a subtitle is automatically set to the user-set language set in the external device (100). Therefore, there is no need to perform a separate DVD language setting. Furthermore, in the case where a plurality of external devices (HDMI equipment) are connected to the TV in a multi-connection manner, they are automatically set in a CEC operation. Therefore, when a plurality of external devices are installed or released, specific functions do not need to be set one by one for each of the external devices.

18 Claims, 6 Drawing Sheets

U.S. PATENT DOCUMENTS

| | | | |
|---|---|---|---|
| 2005/0008340 A1* | 1/2005 | Yamagata et al. | 386/105 |
| 2005/0086702 A1* | 4/2005 | Cormack et al. | 725/135 |
| 2005/0120383 A1 | 6/2005 | Ozaki et al. | |
| 2005/0191034 A1* | 9/2005 | Sakon | 386/95 |
| 2005/0278774 A1* | 12/2005 | Eshleman et al. | 725/153 |
| 2006/0024031 A1* | 2/2006 | Taira et al. | 386/95 |
| 2006/0034590 A1* | 2/2006 | Teramoto | 386/95 |
| 2006/0089735 A1* | 4/2006 | Atkinson | 700/94 |
| 2006/0136120 A1 | 6/2006 | Koga | |
| 2006/0209892 A1 | 9/2006 | MacMullan et al. | |
| 2006/0245725 A1* | 11/2006 | Lim | 386/95 |
| 2006/0256241 A1* | 11/2006 | Suzuki et al. | 348/706 |
| 2006/0280439 A1* | 12/2006 | Ukai et al. | 386/94 |
| 2007/0036158 A1* | 2/2007 | Hun-Kwon et al. | 370/389 |
| 2007/0139769 A1* | 6/2007 | DeCusatis et al. | 359/478 |
| 2007/0242929 A1* | 10/2007 | Okamoto | 386/83 |
| 2007/0288715 A1* | 12/2007 | Boswell et al. | 711/164 |
| 2008/0092043 A1* | 4/2008 | Trethewey | 715/705 |
| 2008/0138032 A1* | 6/2008 | Leyendecker et al. | 386/66 |
| 2009/0046210 A1* | 2/2009 | Sakamoto et al. | 348/738 |
| 2009/0073316 A1* | 3/2009 | Ejima | 348/515 |
| 2009/0116821 A1* | 5/2009 | Shibamiya et al. | 386/124 |
| 2009/0237561 A1* | 9/2009 | Kobayashi | 348/554 |
| 2009/0269036 A1* | 10/2009 | Mitani et al. | 386/96 |
| 2010/0092156 A1* | 4/2010 | McCrossan et al. | 386/104 |
| 2010/0198400 A1* | 8/2010 | Pascal et al. | 700/232 |

FOREIGN PATENT DOCUMENTS

| | | |
|---|---|---|
| JP | 2005-182959 A | 7/2005 |
| JP | 2005-241393 A | 9/2005 |

* cited by examiner

AUTO INSTALL APPARATUS AND METHOD FOR AV DEVICE CONNECTION WITH DIGITAL TV

TECHNICAL FIELD

The present invention relates to an apparatus and method for automatically setting an external device connected to a digital television (TV), wherein a plurality of external devices such as an audio/video (AV) device, connected to the TV via a High Definition Multimedia Interface (HDMI) cable, are controlled using an HDMI Customer Electronics Control (CEC) protocol.

BACKGROUND ART

In general, a digital TV is a device that receives a digital broadcast signal transmitted from a broadcasting station through an internal or external set-top box, processes an image of the received digital broadcast signal and outputs the processed image through a screen.

This digital TV is considered to be an indispensable device for broadcast viewing, because analog broadcasting and digital broadcasting exist together at present, but broadcasting systems will be limited to only the digital broadcasting in future.

The digital TV can output an image and sound by itself. However, in the case of independently outputting an audio signal of a multichannel, such as a 5.1 channel, supported by a video/audio medium (for example, a digital versatile disc (DVD)) or broadcast program, the digital TV cannot express the original sound quality of the audio signal as it is, due to limitations in the number and spatial locations of speakers therein. For this reason, provided that the user pursues high picture quality and high sound quality as in a theater, he/she will construct and use a home theater by connecting a separate DVD player, separate 5.1 channel speaker, separate amplifier, etc. to the digital TV.

Hereinafter, the configuration of a conventional digital TV will be described with reference to FIG. 1.

Figure 1:
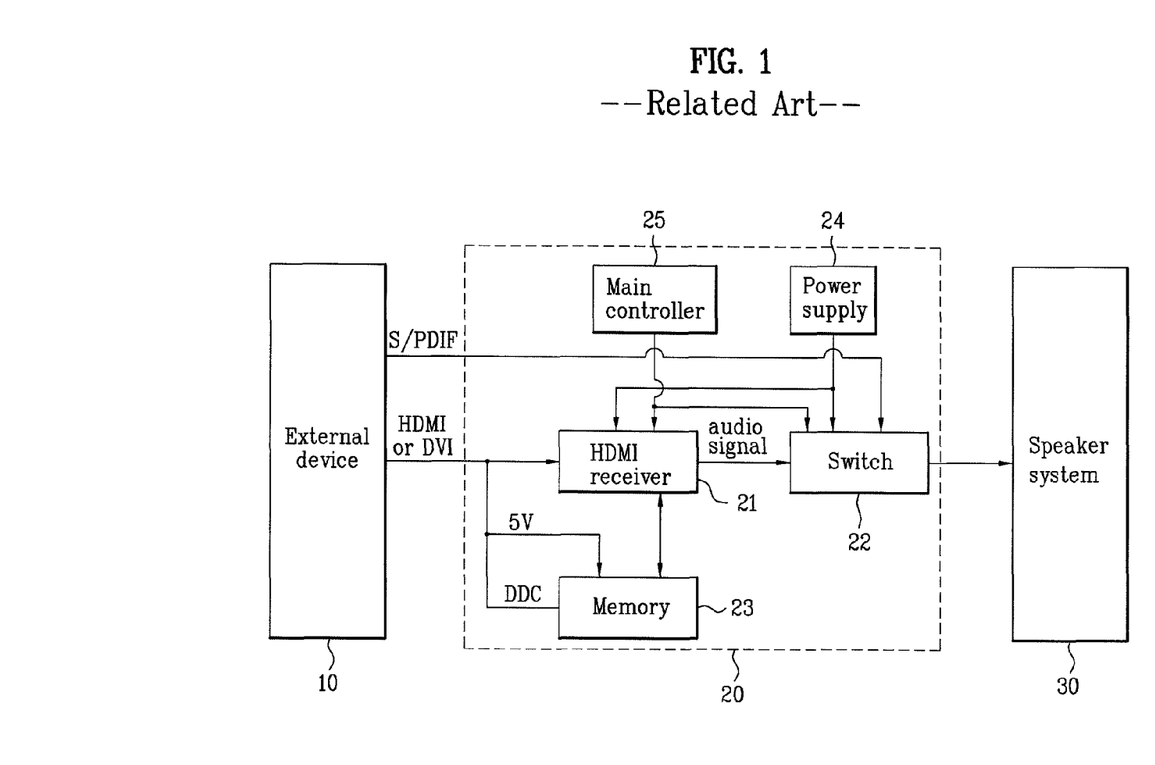
FIG. 1 is a block diagram showing the configuration of a conventional digital TV.

FIG. 1 schematically shows an example of the construction of a conventional home theater including a digital TV.

As shown in FIG. 1, the conventional home theater includes an external device 10, digital TV 20, and speaker system 30.

The external device 10 may be an AV device such as a DVD player, and provides a digital video signal and digital audio signal stored on a DVD to the digital TV 20.

The speaker system 30 is a device that amplifies and outputs a digital audio signal outputted from the digital TV 20. This speaker system 30 may be a multichannel speaker such as a 5.1 channel speaker and have an amplifier added as needed.

The digital TV 20 includes an HDMI receiver 21 for separating a digital video signal and a digital audio signal from a signal inputted through an HDMI cable connected with the external device 10, a switch 22 for selecting one of a digital audio signal inputted through a Sony/Philips Digital Interface (S/PDIF) cable and the digital audio signal separated by the HDMI receiver 21, a memory 23 for storing Extended Display Identification Data (EDID) information defining display parameters and characteristics of the digital TV, a main controller 25 for controlling the HDMI receiver 21 and switch 22, and a power supply 24 for supplying an operating voltage to each component of the digital TV.

Here, an illustration and description of a video signal processing-related configuration, not associated with the present invention, will be omitted.

The digital TV 20 can receive a digital video signal and digital audio signal from the external device 10 through an HDMI cable or Digital Visual Interface (DVI) and SI PDIF cables.

That is, the digital TV 20 receives the digital video signal through the DVI cable and the digital audio signal through the S/PDIF cable, which is a home digital interface standard, respectively, or receives both the digital video signal and digital audio signal through the HDMI cable.

As is well known in the art, the HDMI is an interface that transmits a digital video signal and digital audio signal, conventionally transmitted separately in DVI and SI PDIF manners, through one cable without compressing them.

A description will hereinafter be given of an external device audio signal processing operation of the conventional digital TV with the above-stated configuration.

The user can insert a DVD or compatible compact disc (CD) into the external device 10 and appreciate a movie or listen to music.

For the purpose of listening to music, the user inserts a CD or DVD containing a music file into the external device 10 and pushes a play button of the external device 10.

The external device 10, using an HDMI transmitter, packetizes an audio signal and outputs the resulting packet to the digital TV 20 through an HDMI cable. In the case where the external device does not support the HDMI, it outputs the audio signal through a separate S/PDIF cable.

Under the condition that the digital TV 20 is powered on, the HDMI receiver 21 receives the packet from the external device 10, separates the audio signal from the received packet and outputs the separated audio signal to the switch 22.

Then, the main controller 25 determines that the audio signal is present in the packet received by the HDMI receiver 21 and controls the switch 22 to form a signal path between the HDMI receiver 21 and the speaker system 30.

On the other hand, when the main controller 25 determines that no audio signal is present in the packet received by the HDMI receiver 21, it controls the switch 22 to form a signal path between the S/PDIF cable and the speaker system 30.

The speaker system 30 amplifies the audio signal inputted through the HDMI receiver 21 or S/PDIF cable and outputs the amplified audio signal through a multi-speaker so that the user can listen to music.

However, the above-mentioned conventional digital TV employs an HDMI protocol that is a standard for control of an external device, such as an AV device, connected to the TV via the HDMI cable. For this reason, the digital TV checks HDMI equipment connected therewith using an HDMI input key (hotkey) and provides only basic control functions, namely, simple functions such as input switching and ON/OFF control for the HDMI equipment. In other words, the conventional digital TV has a disadvantage in that it cannot provide more various functions.

DISCLOSURE OF INVENTION

Technical Problem

An object of the present invention devised to solve the problem lies on an apparatus and method for automatically setting an external device connected to a digital TV, wherein the external device, such as an AV device, is connected to the TV via an HDMI cable, and a specific region function and language function are set and controlled in the external device based on data set in the TV using an HDMI CEC protocol.

Technical Solution

The object of the present invention can be achieved by providing an apparatus for automatically setting an external device connected to a digital television (TV), comprising: a High Definition Multimedia Interface (HDMI) receiver for detecting the external device connected to the TV in communication with an HDMI transmitter of the external device; a TV controller for setting a specific region unction and user-set language in the TV and setting the specific region function and user-set language set in the TV in the external device; and an external device controller for driving the external device according to the specific region function and user-set language set in the external device.

The external device may be connected to the TV via an HDMI cable using an HDMI Customer Electronics Control (CEC) protocol.

The TV controller may detect the external device connected to the TV, switch an input of the TV to the external device after detecting the external device and, if the external device is powered on, transmit data of the specific region function and user-set language from the TV to the external device.

The external device controller may automatically set a subtitle of the external device to the user-set language set in the external device.

The external device may be a device that plays a recording medium, which may be any one of a blu-ray player, digital versatile disc (DVD) player, compact disc (CD) player, hard disk drive (HDD) player, video tape recorder (VTR) or video cassette recorder (VCR).

The external device may include a plurality of external devices connected to the TV.

The apparatus may further comprise a switch for sequentially or non-sequentially connecting the plurality of external devices to the TV.

In another aspect of the present invention, provided herein is a method for automatically setting an external device connected to a digital TV, comprising: (a) setting a specific region function and user-set language in the TV; (b) detecting the external device connected to the TV and setting the specific region function and user-set language set in the TV in the external device; and (c) driving the external device according to the specific region function and user-set language set in the external device.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Besides, although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

Figure 2:
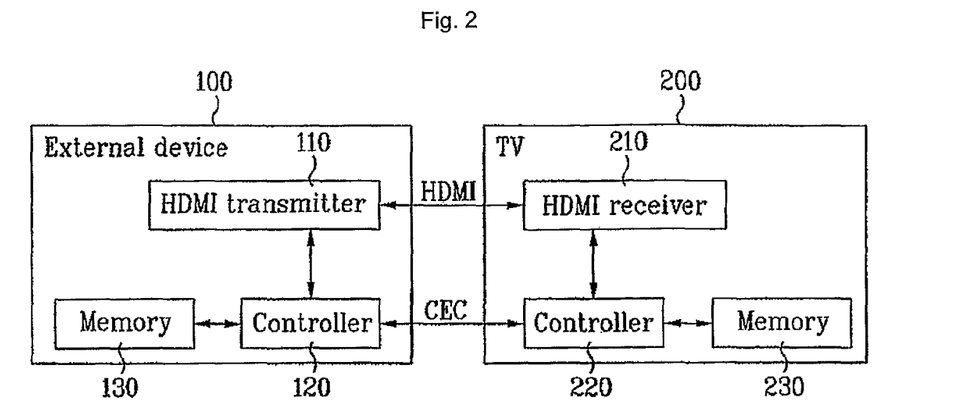
FIG. 2 is a block diagram showing the configuration of one embodiment of an apparatus for automatically setting an external device connected to a digital TV, according to the present invention.

FIG. 2 is a block diagram showing the configuration of one embodiment of an apparatus for automatically setting an external device connected to a digital TV, according to the present invention.

As shown in FIG. 2, the automatic external device setting apparatus according to the present invention includes an external device 100 including an HDMI transmitter 110, controller 120 and memory 130, and a digital TV 200 including an HDMI receiver 210, controller 220 and memory 230.

The external device 100 is connected to the TV 200 via an HDMI cable, and an HDMI CEC protocol is used to control the external device 200.

The TV 200 sets and stores a specific region function and user-set language therein, detects the external device 100 connected thereto, and sets the specific region function and user-set language set therein in the external device 100 through an HDMI CEC function.

The external device 100 is driven according to the specific region function and user-set language set by the TV 200.

To this end, the TV 200 includes a memory 230 for setting and storing the specific region function and user-set language in the TV 200, an HDMI receiver 210 for detecting the external device 100 connected to the TV 200, and a controller 220 for setting the specific region function and user-set language set in the memory 230 of the TV 200 in the external device 100 through the HDMI CEC function.

The controller 220 detects the external device 100 through HDMI CEC communication, switches an input of the TV 200 to the external device 100 after detecting the external device 100 and, if the external device 100 is powered on, transmits data of the specific region function and user-set language to the controller 120 to set the specific region function and user-set language in the external device 100.

The external device 100 includes an HDMI transmitter 110 for transmitting an HDMI signal, a controller 120 for controlling each component of the external device 100 and performing computation and determination functions, and a memory 130.

Also, the external device 100 automatically sets a subtitle function based on the set user-set language when being driven. Here, the external device 100 is preferably an AV device having a DVD title playback function.

Figure 3:
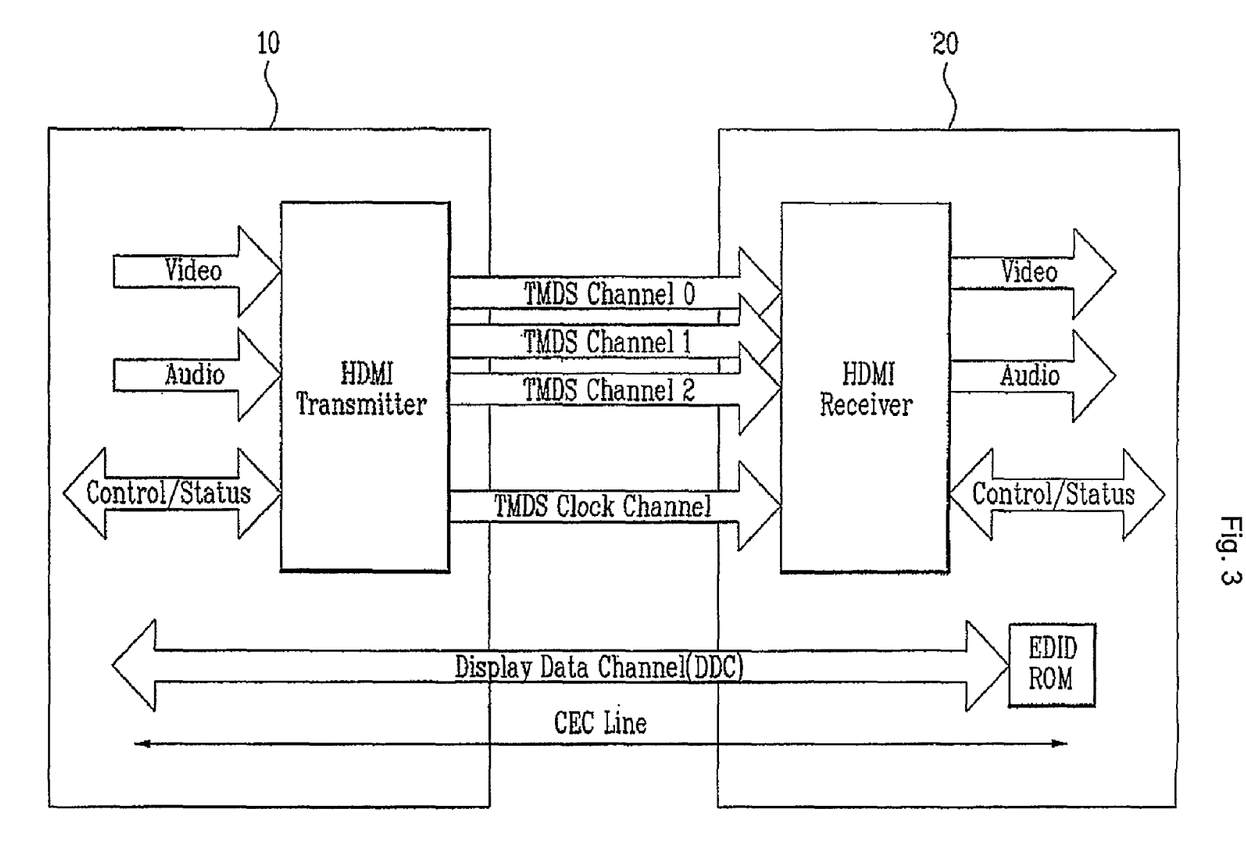
FIG. 3 is a block diagram showing an input/output structure of an HDMI which is applied to the present invention.

FIG. 3 is a block diagram showing an input/output structure of an HDMI which is applied to the present invention.

As shown in FIG. 3, the HDMI applied to the present invention includes three Transition Minimized Differential Signaling (TMDS) data channels 0, 1 and 2, a TMDS clock channel, a Display Data Channel (DDC), a CEC line, and a power supply (+5V).

A digital video signal, namely, video signal components of RGB and YCbCr, and a digital audio signal are combined in the form of one packet in the three TMDS data channels 0, 1 and 2.

The power supply (+5V) is provided to enable the external device to read EDID information of the digital TV over the DDC even when the digital TV is powered off.

In order to enable signal combination and transmission in an HDMI manner, the external device 100 includes an HDMI transmitter for combining and transmitting a digital video signal and a digital audio signal in the form of a packet, and the digital TV 200 includes an HDMI receiver for receiving the packet and separating the digital video signal and the digital audio signal from the received packet.

Figure 4:
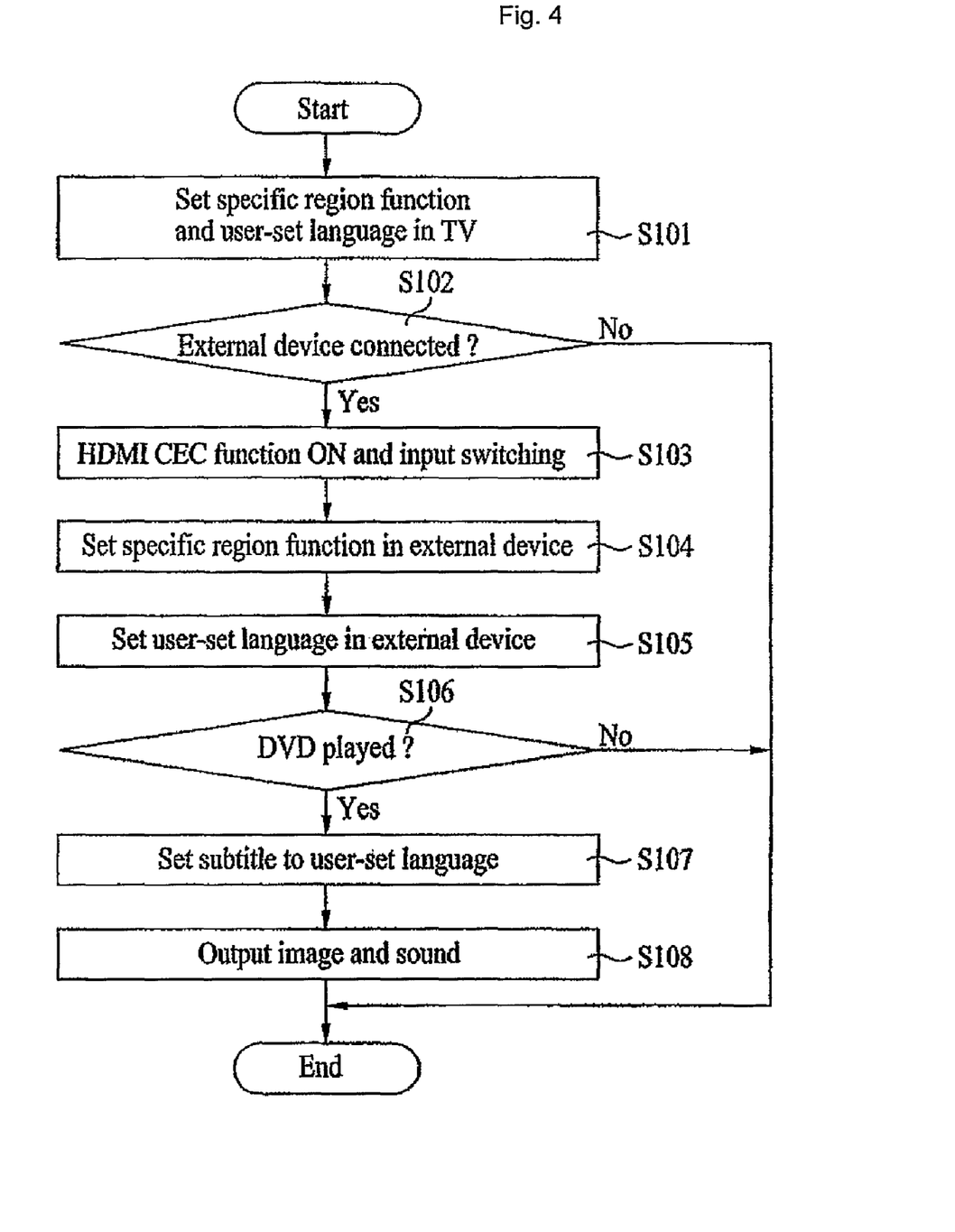
FIG. 4 is a flowchart illustrating one embodiment of a method for automatically setting an external device connected to a digital TV, according to the present invention.

FIG. 4 is a flowchart illustrating one embodiment of a method for automatically setting an external device connected to a digital TV, according to the present invention.

As shown in FIG. 4, the automatic external device setting method according to the present invention employs an HDMI CEC protocol to control an external device connected to a digital TV via an HDMI cable, and includes: setting a specific region function and user-set language in the TV (S101); detecting the external device connected to the TV and setting the specific region function and user-set language set in the TV in the external device through an HDMI CEC function (S102 to S105); and driving the external device according to the specific region function and user-set language set in the external device (S106 to S108).

The external device setting step (S102 to S105) includes: detecting the external device through HDMI CEC communication (S102); switching an input of the TV to the external device after detecting the external device (S103); and transmitting data of the specific region function and user-set language from the TV to the external device if the external device is powered on (S104 and S105).

The external device driving step (S106 to S108) further includes automatically setting a subtitle of the external device to the user-set language set in the external device (S107). The external device has a DVD title playback function.

The operation of the present invention configured as stated above will hereinafter be described in detail with reference to FIGS. 2 and 4.

The present invention employs the HDMI CEC protocol to control the external device 200 connected to the TV 100 via the HDMI cable.

First, as shown in FIG. 4, a specific region function and a user-set language are set in the TV 200 (S101). The specific region function and user-set language set in the TV 200 are stored in the memory 230.

Thereafter, the external device 100 connected to the TV 200 is detected and the specific region function and user-set language set in the TV 200 are set in the external device 100 through the HDMI CEC function (S102 to S105).

That is, the HDMI receiver 210 detects the external device 100 connected to the TV 200, and the controller 220 sets the specific region function and user-set language set in the memory 230 of the TV 200 in the external device 100 through the HDMI CEC function.

As stated previously, the external device setting step (S102 to S105) includes: detecting the external device through the HDMI CEC communication (S102); switching the input of the TV to the external device after detecting the external device (S103); and transmitting the data of the specific region function and user-set language from the TV to the external device if the external device is powered on (S104 and S105).

That is, the controller 220 detects the external device 100 through the HDMI CEC communication, switches the input of the TV 200 to the external device 100 after detecting the external device 100 and, if the external device 100 is powered on, transmits the data of the specific region function and user-set language to the controller 120 to set the specific region function and user-set language in the external device 100.

Thereafter, the external device is driven according to the specific region function and user-set language set therein (S106 to S108).

That is, the external device 100 is driven according to the specific region function and user-set language set by the TV 200 by means of the HDMI transmitter 110, controller 120 and memory 130.

As stated previously, the external device driving step (S106 to S108) further includes automatically setting the subtitle of the external device to the user-set language set in the external device (S107). Here, the external device has the DVD title playback function.

That is, the external device 100 automatically sets the subtitle function based on the set user-set language when being driven. Here, the external device 100 is preferably an AV device having the DVD title playback function.

Figure 5:
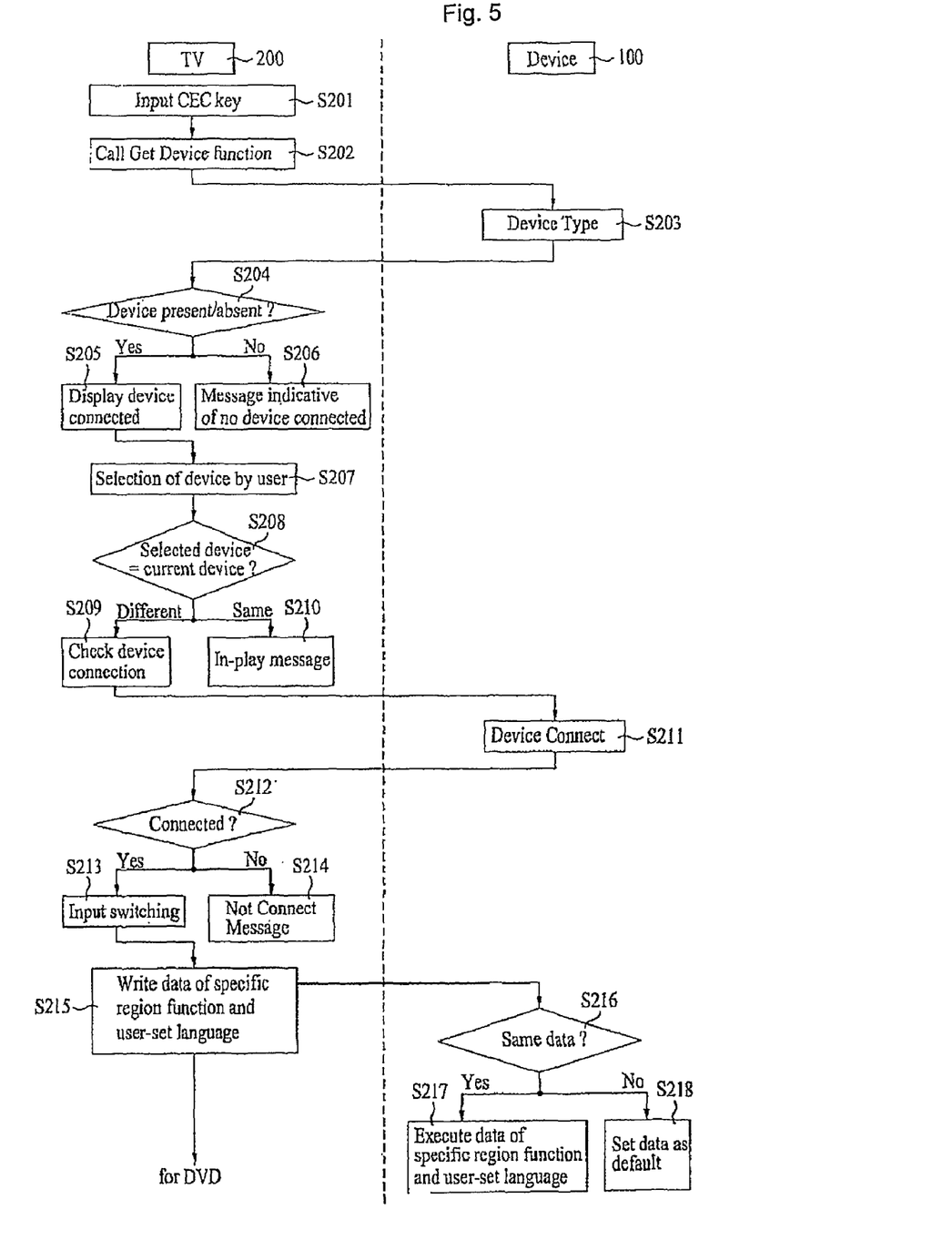
FIGS. 5 and 6 are flowcharts illustrating an alternative embodiment of the method for automatically setting the external device connected to the digital TV, according to the present invention.
Figure 6:
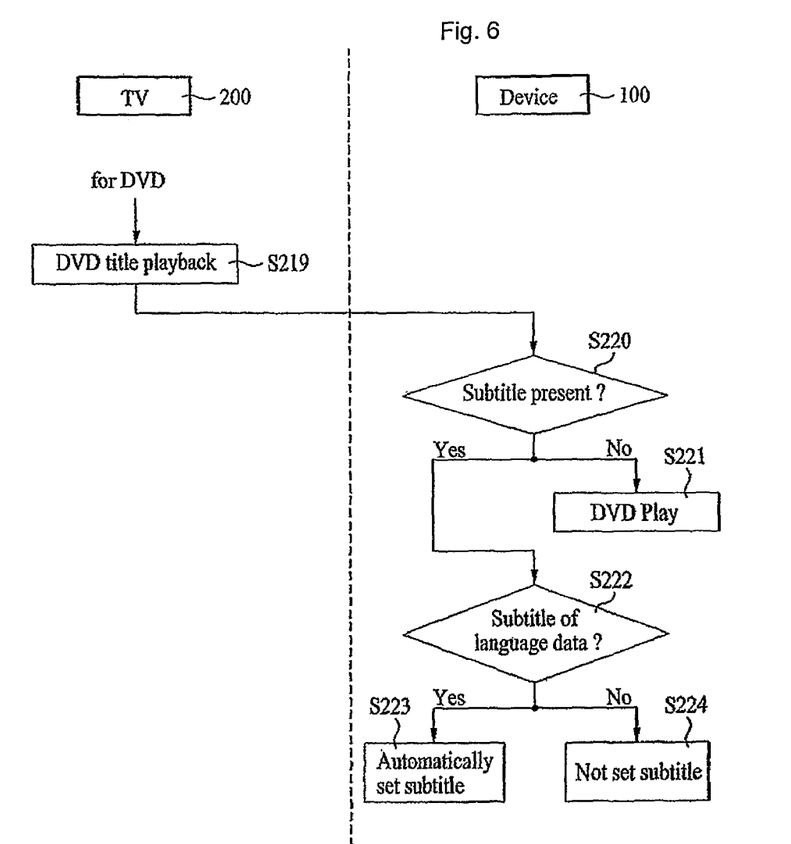

FIGS. 5 and 6 are flowcharts illustrating an alternative embodiment of the method for automatically setting the external device connected to the digital TV, according to the present invention. The operation of the present invention will hereinafter be described in more detail with reference to FIGS. 5 and 6.

First, if a CEC key (not shown) is inputted to the TV 200, the controller 220 calls a Get Device function (S201 and S202).

Then, the controller 220 receives device type information from the external device 100 and, according to device presence/absence, displays the external device 100 connected to the TV 200 or a message indicative of no device connected to the TV 200 on the screen of the TV 200 (S203 to S206).

Thereafter, if the user selects the external device 100 through the screen of the TV 200, the controller 220 determines whether the external device selected by the user is the same as a device currently connected to the TV 200, and displays an in-play message if the two devices are the same and checks a connection of the selected external device to the TV 200 if the two devices are different (S207 to S211).

Upon determining from the above checking process that the selected external device has been connected to the TV 200, the controller 220 switches an input of the TV 200 to the selected external device. Conversely, if the selected external device has not been connected to the TV 200, the controller 220 displays a message indicating such a situation (S212 to S214).

Subsequently, the controller 220 stores data of a specific region function and user-set language in the external device 100. At this time, where the same data is present in the external device, the data is executed. However, where the same data is not present, the stored data is set as a default in the same manner as in existing data (S215 to S218).

On the other hand, when the external device 100 is a DVD player, it performs a DVD title playback function. At this time, the external device 100 determines whether a subtitle is present and automatically sets or does not set the subtitle according to the presence/absence of the subtitle (S219 to S224).

In this manner, the specific region function and the user-set language are automatically set and controlled in the external device. Further, when a DVD is played, a subtitle is automatically set to the user-set language set in the external device. Therefore, there is no need to perform a separate DVD language setting. In addition, in the case where a plurality of external devices are connected to the TV in a multi-connection manner, they are automatically set in a CEC operation. Therefore, when a plurality of external devices are installed or released, specific functions do not need to be set one by one for each of the external devices.

Figure 7:
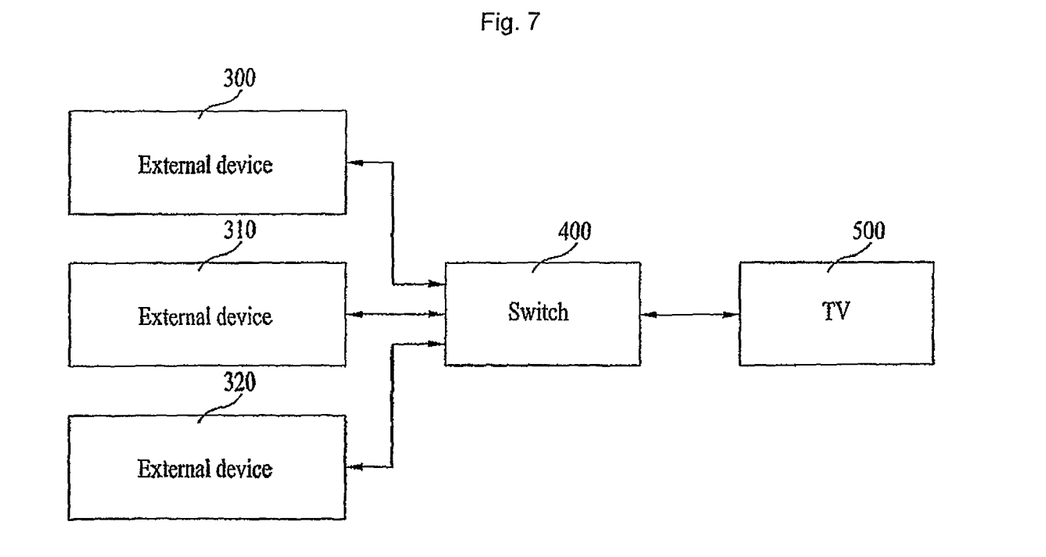
FIG. 7 is a block diagram showing the configuration of an alternative embodiment of the apparatus for automatically setting the external device connected to the digital TV, according to the present invention.

FIG. 7 is a block diagram showing the configuration of an alternative embodiment of the apparatus for automatically setting the external device connected to the digital TV, according to the present invention.

As shown in FIG. 7, in this embodiment, a plurality of external devices 300, 310 and 320 are connected to one TV 500.

The external devices 300, 310 and 320 are selectively connected to or released from the TV 500 through a switch 400.

The switch 400 selects any one of the external devices 300, 310 and 320 and connects the selected external device to the TV 500. At this time, the switch 400 may sequentially or non-sequentially connect the external devices 300, 310 and 320 to the TV 500.

Industrial Applicability

As apparent from the above description, the present invention provides an apparatus and method for automatically setting an external device connected to a digital TV. According to the present invention, the external device is connected to the TV via an HDMI cable, and a specific region function and user language function are automatically set and controlled in the external device based on data set in the TV using an HDMI CEC protocol. In addition, when a DVD is played, a subtitle is automatically set to a user-set language set in the external device. Therefore, there is no need to perform a separate DVD language setting.

Furthermore, in the case where a plurality of external devices (HDMI equipment) are connected to the TV in a multi-connection manner, they are automatically set in a CEC operation. Therefore, when a plurality of external devices are installed or released, specific functions do not need to be set one by one for each of the external devices.

Other implementations are within the scope of the following claims.

The invention claimed is:

1. An apparatus for automatically setting an external device connected to a digital television (TV), comprising:
   a High Definition Multimedia Interface (HDMI) receiver configured to detect the external device connected to the TV in communication with an HDMI transmitter of the external device; and
   a TV controller configured to:
      set a user-set language in the TV;
      detect a user action for displaying a list of the detected external device;
      control, in response to detecting the user action, sending of a signal to the detected external device;
      identify, using a reply to the sent signal, whether the detected external device is present;
      control display of the list according to the identified result;
      detect a user action for selecting one external device included in the displayed list; and
      set a setting value of the selected external device based on the user-set language set in the TV in response to detecting the user action,
   wherein the detected external device is driven according to the set setting value.

2. The apparatus according to claim 1, wherein the external device is connected to the TV via an HDMI cable.

3. The apparatus according to claim 1, wherein the external device is connected to the TV using an HDMI Customer Electronics Control (CEC) protocol.

4. The apparatus according to claim 1, wherein the TV controller switches an input of the TV to the external device after detecting the external device and, when the external device is powered on, controls to transmit data of the user-set language from the TV to the external device.

5. The apparatus according to claim 1, wherein the external device automatically sets a subtitle of the external device according to the set setting value.

6. The apparatus according to claim 5, wherein the external device is a device that plays a recording medium.

7. The apparatus according to claim 6, wherein the external device includes at least one of a blu-ray player, digital versatile disc (DVD) player, compact disc (CD) player, hard disk drive (HDD) player, video tape recorder (VTR) or video cassette recorder (VCR).

8. The apparatus according to claim 1, wherein the external device includes a plurality of external devices connected to the TV.

9. The apparatus according to claim 8, further comprising a switch for sequentially or non-sequentially connecting the plurality of external devices to the TV.

10. A method for automatically setting an external device connected to a digital TV, comprising:
    setting a user-set language in the TV;
    detecting a user action for displaying a list of an external device connected to a digital television (TV);
    sending a signal to an external device in response to detecting the user action;
    identifying, using a reply to the sent signal, whether the detected external device is present;
    displaying the list according to the identified result;
    detecting a user action for selecting one external device included in the displayed list; and
    setting a setting value of the selected external device based on the user-set language set in the TV in response to detecting the user action,
    wherein the detected external device is driven according to the set setting value.

11. The method according to claim 10, wherein the external device is connected to the TV via an HDMI cable.

12. The method according to claim 10, wherein the external device is connected to the TV using an HDMI CEC protocol.

13. The method according to claim 10,
    wherein the setting the setting value of the selected external device comprises:
       switching an input of the TV to the selected external device in response to detecting the the user action; and
       transmitting data of the user-set language from the TV to the selected external device.

14. The method according to claim 10, wherein the external device includes a plurality of external devices connected to the TV.

15. The method according to claim 14, wherein the plurality of external devices are connected to the TV through a switch, the switch sequentially connecting the plurality of external devices to the TV.

16. The method according to claim 10, wherein the driving the external device automatically sets a subtitle of the external device according the set setting value.

17. The method according to claim 16, wherein the external device is a device that plays a recording medium.

18. The method according to claim 17, wherein the external device includes at least one of a blu-ray player, DVD player, CD player, HDD player, VTR or VCR.

* * * * *